United States Patent
Li et al.

(10) Patent No.: US 8,963,874 B2
(45) Date of Patent: Feb. 24, 2015

(54) TOUCH SCREEN RENDERING SYSTEM AND METHOD OF OPERATION THEREOF

(75) Inventors: Hao Li, Chandler, AZ (US); Yi Wei, Chandler, AZ (US); Steven Young, Gilbert, AZ (US)

(73) Assignee: Symbol Technologies, Inc., Holtsville, NY (US)

( * ) Notice: Subject to any disclaimer, the term of this patent is extended or adjusted under 35 U.S.C. 154(b) by 980 days.

(21) Appl. No.: 12/848,127

(22) Filed: Jul. 31, 2010

(65) Prior Publication Data

US 2012/0026124 A1    Feb. 2, 2012

(51) Int. Cl.
G06F 3/041    (2006.01)
G06F 3/042    (2006.01)
G06F 3/047    (2006.01)
G06F 3/043    (2006.01)
G06F 3/045    (2006.01)

(52) U.S. Cl.
CPC .............. *G06F 3/0414* (2013.01); *G06F 3/045* (2013.01)
USPC .......................................................... 345/174

(58) Field of Classification Search
CPC ................. G06F 3/041; G06F 3/0414; G06F 3/042–3/047
USPC .................................................. 345/173–174
See application file for complete search history.

(56) References Cited

U.S. PATENT DOCUMENTS

| 4,252,391 A | 2/1981 | Sado |
|---|---|---|
| 4,315,238 A | 2/1982 | Eventoff |
| 4,570,149 A | 2/1986 | Thornburg et al. |
| 4,625,075 A | 11/1986 | Jaeger |
| 4,739,299 A | 4/1988 | Eventoff et al. |
| 4,745,240 A | 5/1988 | Furukawa et al. |
| 4,800,260 A | 1/1989 | Simpson-Davis et al. |
| 5,008,497 A | 4/1991 | Asher |
| 5,060,527 A | 10/1991 | Burgess |

(Continued)

FOREIGN PATENT DOCUMENTS

| CA | 2316067 A1 | 2/2002 |
|---|---|---|
| CN | 101201277 A | 6/2008 |

(Continued)

OTHER PUBLICATIONS

International Search Report and Written Opinion for International Application No. PCT/US2011/044214 mailed on Dec. 1, 2011.

(Continued)

*Primary Examiner* — Kent Chang
*Assistant Examiner* — Nathan Brittingham

(57) ABSTRACT

A touch-screen display apparatus, the apparatus may include first and second sheets having opposed major surfaces and a size and shape defined by a periphery. The periphery may be defined by opposed ends and opposed edges. The first and second sheets may each have a conductive pattern including a pair of opposed busbars and a plurality of traces electrically coupled to, and extending between, corresponding pairs of opposed busbars. The transparent force sensing (TFS) sheet may have opposed major surfaces and a variable resistance which is related to a force exerted upon one or more of its major surfaces. The TFS sheet may be situated between the first and second sheets. The apparatus may also include one or more separation portions situated between the TFS sheet and the first or second sheet to bias the TFS sheet apart from the first or second sheet.

8 Claims, 9 Drawing Sheets

(56) References Cited

U.S. PATENT DOCUMENTS

| | | |
|---|---|---|
| 5,241,308 A | 8/1993 | Young |
| 5,510,813 A | 4/1996 | Makinwa et al. |
| 5,647,017 A | 7/1997 | Smithies et al. |
| 5,673,041 A | 9/1997 | Chatigny et al. |
| 5,989,700 A | 11/1999 | Krivopal |
| 6,034,335 A * | 3/2000 | Aufderheide et al. ........ 200/5 A |
| 6,073,497 A | 6/2000 | Jiang et al. |
| 6,193,152 B1 | 2/2001 | Fernando et al. |
| 6,239,790 B1 | 5/2001 | Martinelli et al. |
| 6,291,568 B1 | 9/2001 | Lussey |
| 6,307,955 B1 | 10/2001 | Zank et al. |
| 6,310,614 B1 | 10/2001 | Maeda et al. |
| 6,473,072 B1 | 10/2002 | Comiskey et al. |
| 6,492,979 B1 | 12/2002 | Kent et al. |
| 6,543,299 B2 | 4/2003 | Taylor |
| 6,558,577 B1 | 5/2003 | Niihara et al. |
| 6,628,269 B2 | 9/2003 | Shimizu |
| 6,781,576 B2 | 8/2004 | Tamura |
| 6,873,715 B2 | 3/2005 | Kuo et al. |
| 7,081,888 B2 | 7/2006 | Cok et al. |
| 7,084,859 B1 | 8/2006 | Pryor |
| 7,093,197 B2 | 8/2006 | Yoshii et al. |
| 7,146,577 B2 | 12/2006 | Hoffman |
| 7,152,482 B2 | 12/2006 | Ueno et al. |
| 7,154,481 B2 | 12/2006 | Cross et al. |
| 7,196,694 B2 | 3/2007 | Roberts |
| 7,331,245 B2 | 2/2008 | Nishimura et al. |
| 7,339,580 B2 | 3/2008 | Westerman et al. |
| 7,355,594 B2 | 4/2008 | Barkan |
| 7,355,595 B2 | 4/2008 | Bathiche et al. |
| 7,415,141 B2 | 8/2008 | Okazaki |
| 7,499,040 B2 | 3/2009 | Zadesky et al. |
| 7,511,702 B2 | 3/2009 | Hotelling |
| 7,538,760 B2 | 5/2009 | Hoteling |
| 7,627,143 B1 | 12/2009 | Abebe |
| 7,695,647 B2 | 4/2010 | Smela et al. |
| 7,792,336 B2 | 9/2010 | Crockett et al. |
| 8,149,211 B2 | 4/2012 | Hayakawa et al. |
| 8,325,143 B2 | 12/2012 | Destura et al. |
| 8,390,583 B2 | 3/2013 | Forutanpour et al. |
| 2002/0180763 A1 | 12/2002 | Kung |
| 2003/0132294 A1 | 7/2003 | Gomez et al. |
| 2003/0205450 A1 | 11/2003 | Divigalpitiya et al. |
| 2004/0028993 A1 | 2/2004 | Jousse et al. |
| 2004/0212599 A1 | 10/2004 | Cok et al. |
| 2005/0081640 A1 | 4/2005 | Knowles et al. |
| 2005/0287048 A1 | 12/2005 | Parkinson |
| 2006/0066584 A1 | 3/2006 | Barkan |
| 2006/0137462 A1 | 6/2006 | Divigalpitiya et al. |
| 2006/0146036 A1 | 7/2006 | Prados et al. |
| 2006/0262099 A1 | 11/2006 | Destura et al. |
| 2006/0279548 A1 | 12/2006 | Geaghan |
| 2007/0045593 A1 | 3/2007 | Yasuda et al. |
| 2007/0175987 A1 | 8/2007 | Havens et al. |
| 2007/0198926 A1 | 8/2007 | Joguet et al. |
| 2007/0202765 A1 | 8/2007 | Krans et al. |
| 2007/0222764 A1 | 9/2007 | Wang |
| 2007/0229464 A1 | 10/2007 | Hotelling et al. |
| 2007/0236466 A1 | 10/2007 | Hotelling |
| 2007/0268275 A1 | 11/2007 | Westerman et al. |
| 2008/0024454 A1 | 1/2008 | Everest |
| 2008/0029691 A1 | 2/2008 | Han |
| 2008/0048989 A1 | 2/2008 | Yoon et al. |
| 2008/0058022 A1 | 3/2008 | Ahn |
| 2008/0091121 A1 | 4/2008 | Sun et al. |
| 2008/0093687 A1 | 4/2008 | Antaki |
| 2008/0165141 A1 | 7/2008 | Christie |
| 2008/0180399 A1 | 7/2008 | Cheng |
| 2008/0204426 A1 | 8/2008 | Hotelling et al. |
| 2008/0211784 A1 | 9/2008 | Hotelling et al. |
| 2008/0211785 A1 | 9/2008 | Hotelling et al. |
| 2008/0231604 A1 | 9/2008 | Peterson |
| 2008/0292887 A1 | 11/2008 | Kim et al. |
| 2008/0303797 A1 | 12/2008 | Grothe |
| 2008/0309639 A1 | 12/2008 | Wei et al. |
| 2009/0027353 A1 | 1/2009 | Im et al. |
| 2009/0120696 A1 | 5/2009 | Hayakawa et al. |
| 2009/0189877 A1* | 7/2009 | Washino et al. ............... 345/174 |
| 2009/0237374 A1* | 9/2009 | Li et al. ......................... 345/174 |
| 2009/0278815 A1 | 11/2009 | Li et al. |
| 2009/0295748 A1 | 12/2009 | Liu et al. |
| 2010/0037709 A1 | 2/2010 | Yeh et al. |
| 2010/0045610 A1 | 2/2010 | Hong et al. |
| 2010/0060602 A1 | 3/2010 | Agari et al. |
| 2010/0066686 A1 | 3/2010 | Joguet et al. |
| 2010/0117974 A1 | 5/2010 | Joguet et al. |
| 2010/0141085 A1 | 6/2010 | Wu et al. |
| 2010/0225443 A1 | 9/2010 | Bayram et al. |
| 2010/0289507 A1 | 11/2010 | Joguet et al. |
| 2010/0289508 A1 | 11/2010 | Joguet et al. |
| 2010/0302196 A1 | 12/2010 | Han et al. |
| 2010/0302197 A1 | 12/2010 | Joguet et al. |
| 2011/0001487 A1 | 1/2011 | Joguet et al. |
| 2011/0025615 A1 | 2/2011 | Yang et al. |
| 2011/0025619 A1 | 2/2011 | Joguet et al. |
| 2011/0050394 A1 | 3/2011 | Zhang et al. |
| 2011/0050588 A1 | 3/2011 | Li et al. |
| 2011/0115736 A1 | 5/2011 | Joguet et al. |
| 2011/0119580 A1 | 5/2011 | Joguet et al. |
| 2011/0134067 A1 | 6/2011 | Joguet et al. |
| 2011/0141026 A1 | 6/2011 | Joquet et al. |
| 2011/0168957 A1 | 7/2011 | Lonjon et al. |
| 2011/0169760 A1 | 7/2011 | Largillier |
| 2011/0181546 A1 | 7/2011 | Joguet et al. |
| 2011/0181547 A1 | 7/2011 | Joguet et al. |
| 2011/0227836 A1 | 9/2011 | Li et al. |
| 2011/0273394 A1 | 11/2011 | Young et al. |
| 2013/0063364 A1 | 3/2013 | Moore |
| 2013/0141338 A1 | 6/2013 | Wei et al. |

FOREIGN PATENT DOCUMENTS

| | | |
|---|---|---|
| EP | 1471415 A2 | 10/2004 |
| EP | 2000896 A2 | 12/2008 |
| FR | 2914756 A1 | 10/2008 |
| FR | 2925717 A1 | 6/2009 |
| JP | 5143219 A | 6/1993 |
| JP | 2005350614 A | 12/2005 |
| JP | 2011003104 A | 1/2011 |
| WO | 9850876 A1 | 11/1998 |
| WO | 0241129 A2 | 5/2002 |
| WO | 03021568 A1 | 3/2003 |
| WO | 03094186 A1 | 11/2003 |
| WO | 2004066136 A2 | 8/2004 |
| WO | 2006013485 A2 | 2/2006 |
| WO | 2006017695 A2 | 2/2006 |
| WO | 2007012899 A1 | 2/2007 |
| WO | 2009035184 A1 | 3/2009 |
| WO | 2009104840 A2 | 8/2009 |
| WO | 2010117882 A2 | 10/2010 |
| WO | 2010141737 A2 | 12/2010 |

OTHER PUBLICATIONS

U.S. Appl. No. 12/052,365, filed Mar. 20, 2008 entitled "Transparent Pressure Sensor and Method for Using".
U.S. Appl. No. 12/548,983, filed Aug. 27, 2009 entitled "Systems and Methods for Pressure Based Authentication of a Signature on a Touch Screen".
U.S. Appl. No. 12/549,008, filed Aug. 27, 2009 entitled "Method and Apparatus for Pressure-Based Manipulation of Content on a Touch Screen".
Final Office Action mailed on Apr. 11, 2013 in related U.S. Appl. No. 12/776,627, Steven Young, filed May 10, 2010.
Final Office Action mailed on Aug. 23, 2012 in U.S. Appl. No. 12/052,365, Hao Li, filed Mar. 20, 2008.
Final Office Action mailed on Jan. 17, 2013 in U.S. Appl. No. 12/548,983, Keshu Zhang, filed Aug. 27, 2009.
Final Office Action mailed on Jul. 14, 2011 in U.S. Appl. No. 12/052,365, Hao Li, filed Mar. 20, 2008.
International Preliminary Report on Patentability and Written Opinion for counterpart International Application PCT/US2011/044214 mailed on Feb. 14, 2013.

(56) References Cited

OTHER PUBLICATIONS

International Preliminary Report on Patentability and Written Opinion for related International Application No. PCT/US2010/046718 mailed on Mar. 8, 2012.
International Preliminary Report on Patentability and Written Opinion for related International Application No. PCT/US2011/032596 mailed on Nov. 22, 2012.
International Preliminary Report on Patentability and Written Opinion for related International Application PCT/US2010/060967 mailed on Sep. 27, 2012.
International Preliminary Report on Patentability and Written Opinion for related International Patent Application No. PCT/US2010/046717 issued on Mar. 8, 2012.
International Search Report and Written Opinion for related International Application No. PCT/US2010/046717 mailed on Nov. 30, 2010.
International Search Report and Written Opinion for related International Application No. PCT/US2010/046718 mailed on Dec. 8, 2010.
International Search Report and Written Opinion for related International Application No. PCT/US2010/060967 mailed on Jun. 15, 2012.
International Search Report and Written Opinion for related International Application No. PCT/US2011/032596 mailed on Sep. 30, 2011.
International Search Report for related International Application No. PCT/US2012/067079 mailed on Mar. 12, 2013.
Non Final Office Action mailed Apr. 8, 2013 in related U.S. Appl. No. 13/309,929, Yi Wei, filed Dec. 2, 2011.
Non Final Office Action mailed on Apr. 6, 2012 in U.S. Appl. No. 12/052,365, Hao Li, filed Mar. 20, 2008.
Non Final Office Action mailed on Aug. 3, 2012 in U.S. Appl. No. 12/548,983, Keshu Zhang, filed Aug. 27, 2009.
Non Final Office Action mailed on Feb. 14, 2013 in related U.S. Appl. No. 12/725,699, Hao Li, filed Mar. 17, 2010.
Non Final Office Action mailed on Feb. 24, 2011 in U.S. Appl. No. 12/052,365, Hao Li, filed Mar. 20, 2008.
Non Final Office Action mailed on Mar. 26, 2012 in U.S. Appl. No. 12/548,983, Keshu Zhang, filed Aug. 27, 2009.
Non Final Office Action mailed on May 24, 2012 in related U.S. Appl. No. 12/549,008, Hao Li, filed Aug. 27, 2009.
Non Final Office Action mailed on Sep. 28, 2012 in related U.S. Appl. No. 12/776,627, Steven Young, filed May 10, 2010.
Notice of Allowance mailed on Nov. 29, 2012 in related U.S. Appl. No. 12/549,008, Hao Li, filed Aug. 27, 2009.
Notice of Allowance mailed on Sep. 7, 2012 in related U.S. Appl. No. 12/549,008, Hao Li, filed Aug. 27, 2009.
English translation of Korean Office Action for related Application No. 10-2012-7004899 issued on Feb. 20, 2013.
Non Final Office Action mailed on Jul. 9, 2013 in related U.S. Appl. No. 12/052,365, Hao Li, filed Mar. 20, 2008.
Non Final Office Action mailed on Aug. 21, 2013 in related U.S. Appl. No. 12/725,699, Hao Li, filed Mar. 17, 2010.
Final Office Action mailed on Aug. 16, 2013 in related U.S. Appl. No. 13/309,929, Yi Wei, filed Dec. 2, 2011.
Final Office Action mailed Oct. 29, 2013 in related U.S. Appl. No. 12/052,365, Hao Li, filed Mar. 20, 2008.
Notice of Allowance mailed Oct. 8, 2013 in related U.S. Appl. No. 12/548,983, Keshu Zhang, filed Aug. 27, 2009.

\* cited by examiner

MEASURING X-POSITION

MEASURING Y-POSITION

TOUCH SCREEN RENDERING SYSTEM AND METHOD OF OPERATION THEREOF

FIELD OF THE PRESENT SYSTEM

The present system relates to a touch screen rendering system and, more particularly, to a force sensing analog touch screen rendering device configured to detect a contact force applied thereto.

BACKGROUND OF THE PRESENT SYSTEM

Typically, pixelated force-sensing touch-screen displays such as disclosed by US Patent Publication No. 2009/0237374 and U.S. patent application Ser. No. 12/725,699 filed Mar. 17, 2010, the contents of each of which are incorporated herein by reference, employ two sets of electrodes which are arranged such that one set of electrodes is perpendicular to the other set of electrodes. These electrodes are then arranged on opposite surfaces of a transparent force sensing (TFS) layer. When a force is applied to one or more locations on the touch-screen display, positions at which these forces are applied (e.g., in an x, y, plane) are determined digitally by the position of an intersection of corresponding perpendicular electrodes which are subject to the force. The magnitude of the force is determined by the resistance value at each force intersection. Accordingly, these displays are capable of providing multi-touch sensing and can simultaneously sense force for a touch location. However, because of their complexity, multi-touch displays are cost prohibitive in certain applications. Further, these displays require multiple scans where each pixel needs to be scanned for every frame, and as such are slow for certain applications.

SUMMARY OF THE PRESENT SYSTEM

The system, device(s), method, user interface, computer program, etc., (hereinafter each of which will be referred to as system, unless the context indicates otherwise) described herein addresses problems in prior art systems.

The present system discloses a low-cost and easy to manufacture analog touch sensing display screen system which may be suitable for single-touch applications such as enterprise applications. As a further advantage, the present system provides a touch screen display system that is inexpensive, and can provide fast touch detection with location and force information. Further, the present system may be inexpensively adapted for signature capture capabilities which would be ideal in an enterprise system.

In accordance with embodiments of the present system, there is disclosed a touch panel (TP) display apparatus, the apparatus may include first and second sheets, each having opposed major surfaces and a periphery defined by opposed ends and opposed edges, the first and second sheets each may have a conductive pattern including a pair of opposed busbars electrically coupled to corresponding ones of the first and second sheets. A transparent force sensing (TFS) sheet having opposed major surfaces and a variable resistance may be situated between the first and second sheets. Separation portions may be situated between the TFS sheet and the first or second sheet to bias the TFS sheet apart from the first or second sheet. The opposed pairs of busbars may be selectively coupled by a controller to a voltmeter, a voltage source, an analog-to-digital (A/D) converter, or a digital-to-analog (D/A) converter. Moreover, the apparatus may include a controller configured to determine a location of force (i.e., due to a force exerted by a user on a the TP) and a magnitude of the force, the processor coupled to one or more of the voltmeter, the voltage source, the analog-to-digital (A/D) converter, and the digital-to-analog (D/A) converter. Accordingly, the apparatus may scan the sheets to determine a resistance across the first and second sheets, for example at the same time. Further, the apparatus may determine a voltage which may correspond with a resistance of the first and second sheets.

It is further envisioned that a transparent protective layer may be superimposed upon a major surface of the first or second sheets. Further, the busbars of the first major sheet may extend between the opposed edges and may be proximate to an adjacent end of the opposed ends of the first major sheet. Further the plurality of traces of the first and second sheets may be substantially perpendicular to each other. Moreover, the apparatus may include a substrate superimposed upon a major surface of the first or second sheets.

In accordance with an aspect of the present system, there is disclosed a method of forming a touch-screen display, the method may include one or more acts of: forming first and second sheets, each having opposed major surfaces and a periphery defined by opposed ends and opposed edges, the first and second sheets each having a conductive pattern including a pair of opposed busbars electrically coupled to corresponding ones of the first and second sheets, the TFS sheet having opposed major surfaces and a variable resistance; and biasing the first or second sheets apart from the TFS sheet using separation portions situated between the TFS sheet and the first or second sheet.

The method may further include an act of electronically coupling the opposed pairs of busbars to a voltmeter, a voltage source, an analog-to-digital (A/D) converter, or a digital-to-analog (D/A) converter. It is further envisioned that the method may include an act of coupling a processor configured to determine a location of force and a magnitude of force to one or more of the voltmeter, the voltage source, the analog-to-digital (A/D) converter, and the digital-to-analog (D/A) converter. The method may further include an act of placing a transparent protective layer upon a major surface of the second major sheet. Moreover, the busbars of the first major sheet may extend between the opposed edges and may be proximate to an adjacent end of the opposed ends of the first major sheet.

It is further envisioned that the method may include an act of configuring the plurality of traces of the first and second sheets substantially perpendicular to each. Moreover, the method may include an act of superposing a substrate to a major surface of the first or second sheets.

In accordance with yet another aspect of the present system, there is disclosed a method of operating a touch panel (TP) using a controller, the method may include one or more acts of: applying a predetermined voltage across a first end of a first conductive pattern having first and second ends on a first layer and a second end of a second conductive pattern electrically coupled to the first conductive pattern via a resistance (Rt), the second conductive pattern having first and second ends and located on a second layer; determining a resistance (Rx) across the first and second ends of the first conductive pattern; determining a first voltage (V1) at the second end of the first conductive pattern; determining a second voltage (V2) at the first end of the second conductive pattern; and determining a value of Rt based upon V1, V2, and Rx.

The method may further include an act of determining a magnitude of force applied to the first or second layers of the TP based upon a value of Rt.

It is also envisioned that the method may include one or more acts of: applying a voltage (Vcc2) across a first and second ends of the first or second conductive pattern; measuring a voltage (V3) at the second end of the other of the first or second conductive panels; and determining a coordinate of force applied to the first or second layers of the TP based upon a ratio of V3 to Vcc2. According to the method the resistance Rt may be a variable resistance substantially equal to a resistance across a transparent force sensing (TFS) sheet interposed between the first and second layers and may change based upon a force applied to the sheet.

In accordance with yet a further aspect of the present system, there is disclosed a computer program stored on a computer readable memory medium, the computer program configured to operate a touch panel (TP) of a user interface (UI), the computer program may include a program portion configured to: apply a predetermined voltage across a first end of a first conductive pattern having first and second ends on a first layer and a second end of a second conductive pattern electrically coupled to the first conductive pattern via a resistance (Rt), the second conductive pattern having first and second ends and located on a second layer; determine a resistance (Rx) across the first and second ends of the first conductive pattern; determine a first voltage (V1) at the second end of the first conductive pattern; determine a second voltage (V2) at the first end of the second conductive pattern; and/or determine a value of Rt based upon V1, V2, and Rx.

It is further envisioned that the program portion may be configured to: determine a magnitude of a force applied to the first or second layers of the TP based upon a value of Rt; apply another voltage (Vcc2) across a first and second ends of the first or second conductive pattern; measure a voltage (V3) at the second end of the other of the first or second conductive panels; and/or determine a coordinate of the force based upon a ratio of V3 to Vcc2.

BRIEF DESCRIPTION OF THE DRAWINGS

The invention is explained in further detail, and by way of example, with reference to the accompanying drawings wherein.

DETAILED DESCRIPTION OF THE PRESENT SYSTEM

Figure 1:
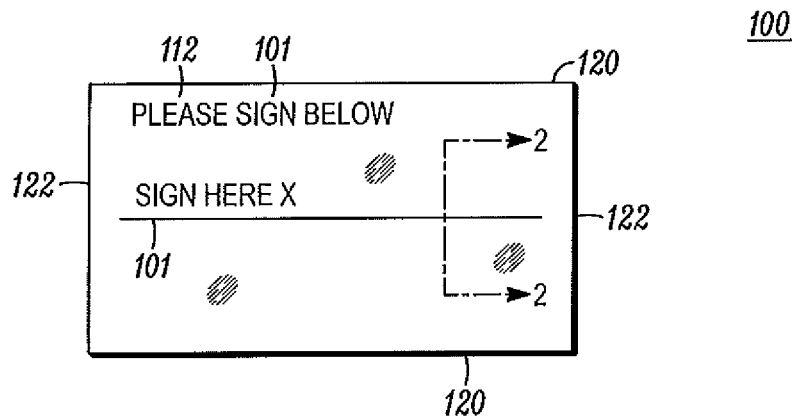
FIG. 1 is a plan view of a touch panel (TP) in accordance with embodiments of the present system.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

The term rendering and formatives thereof as utilized herein refer to providing content, such as digital media, such that it may be perceived by at least one user sense, such as a sense of sight and/or a sense of hearing. For example, the present system may render a user interface (UI) on a display device so that it may be seen and interacted with by a user. Further, the present system may render audio visual content on both of a device that renders audible output (e.g., a speaker, such as a loudspeaker) and a device that renders visual output (e.g., a display). To simplify the following discussion, the term content and formatives thereof will be utilized and should be understood to include audio content, visual content, audio visual content, textual content and/or other content types, unless a particular content type is specifically intended, as may be readily appreciated.

The user interaction with and manipulation of a computer environment is achieved using any of a variety of types of human-processor interface devices that are operationally coupled to a processor controlling the displayed environment. A common interface device for a user interface (UI), such as a graphical user interface (GUI) is a touch-sensitive display, etc. For example, a stylus or force transmitting device (e.g., a user's finger) may be moved by a user in a planar (or non-planar) workspace to move a visual object, such as a cursor or pixelator (e.g., for indicating a user's interaction with a screen of a GUI) depicted on, for example, a two-dimensional display surface in a direct mapping between the position of the user manipulation and the depicted position of the cursor. This is typically known as position control, where the motion of the depicted object directly correlates to motion of the user manipulation. Similar interfaces may be provided by a device having a touch sensitive screen that is operated on by an input device such as a finger of a user or other input device such as a stylus. In this environment, a cursor may or may not be provided since location of selection is directly determined by the location of interaction with the touch sensitive screen.

The present system may also provide a graphical user interface (GUI) which may present a typical UI including a windowing environment and as such, may include menu items, submenu items, pull-down menu items, pop-up windows, selection items, radio boxes, check boxes, frames, signature capture boxes, content zooming operations (e.g., pinch and/or squeeze operations) etc., that are typical of those provided in a windowing environment, such as may be represented within a Windows™ Operating System GUI as provided by Microsoft Corporation and/or an OS X™ Operating System GUI and/or hardware, such as provided on an iPhone™, MacBook™, iMac™, iPad™, etc. (e.g., a user device), as provided by Apple, Inc., and/or another operating system. The objects and sections of the GUI may be navigated using a user input device, such as a finger(s), a stylus, and/or other suitable user input. Further, the user input may be utilized for making selections within the GUI such as by selection of menu items, submenu items, window items, radio buttons, pop-up windows, signature boxes, signature selection, for example, in response to a touch screen input operation, and other common interaction paradigms as understood by a person of ordinary skill in the art.

Although the GUI utilized for supporting touch sensitive inputs may be somewhat different than a GUI that is utilized for supporting, for example, a computer mouse input, however, for purposes of the present system, the operation is similar. Accordingly, for purposes of simplifying the foregoing description, the interaction discussed is intended to apply to either of these systems or others that may be suitably applied.

For purposes of simplifying a description of the present system, the terms "operatively coupled", "coupled" and formatives thereof as utilized herein refer to a connection between devices and/or portions thereof that enables operation in accordance with the present system. For example, an operative coupling may include one or more of a wired connection and/or a wireless connection between two or more devices that enables a one and/or two-way communication path between the devices and/or portions thereof.

FIG. 1 is a plan view of a touch panel (TP) 100 in accordance with embodiments of the present system. The TP 100 may have opposed ends 122 and opposed edges 120 which may define a periphery of the TP 100 and a periphery of a major surface of the TP 100 (as opposed to a thickness/depth of the TP 100). The TP 100 may be transparent so that it may display content such as, for example, items 101 that may be rendered by a display portion. Accordingly, the TP 100 may include a display portion (e.g., a liquid crystal display (LCD), an electrophoretic display, etc.). It is further envisioned that the TP 100 may have any desired shape and/or size (e.g., round, oval, square, rectangular, etc.).

Figure 2:
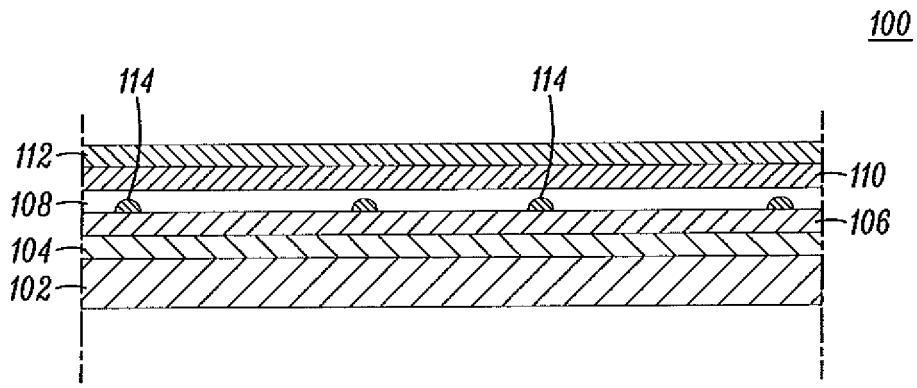
FIG. 2 is a cross sectional view of a portion of a TP taken along lines 2-2 of FIG. 1 in accordance with embodiments of the present system.

FIG. 2 is a cross sectional view of a portion of a TP 100 taken along lines 2-2 of FIG. 1 in accordance with embodiments of the present system. The TP 100 may include one or more of a substrate 102, conductive film layers 104 and 110, a transparent force sensing (TFS) portion 106, a spacer layer 108, and an upper layer 112. The layers 104 through 112 may be transparent so that they may be placed over a display which may render content for a user's convenience. However, one or more of the layers 104 through 112 and/or the substrate may also include graphics, text, be translucent, etc., as desired.

The substrate 102 may be a flat surface formed from a suitable material which may include, for example, a polymer (e.g., acrylic, etc.), glass, etc. The substrate 100 may be mounted upon or include any suitable display portion, such as a liquid crystal display (LCD), an electrophoretic display, etc. Accordingly, the substrate 102, as well as the other layers, may be substantially transparent and be formed using one or more substantially transparent materials.

The TFS layer 106 may include a transparent film which may include a transparent matrix which may include a suitable polymer material and a plurality of transparent conductive particles dispersed in the transparent matrix. Suitable polymer materials may include, for example, phenoxy resin, polyester, silicone rubber, polyimide, etc. The conducting particles may include indium tin oxide, zinc oxide, tin oxide, etc., which may have dimensions which are less than the wavelength of light in the visible range so as to minimize light scattering during use, and may be dispersed in the transparent matrix. The TFS layer 106 may change resistance when subject to a force (e.g., a compressive force) applied directly and/or indirectly to a surface of the TFS layer 106. In accordance with embodiments of the present system, by detecting this change in resistance of the TFS layer 106, a magnitude of the force may be determined.

The conductive layers 104 and 110 may correspond with x and y planes, respectively, and may include suitable conductive materials such as conductive films which may include a transparent conductive film such as, for example, an Indium Tin Oxide (ITO) film.

Figure 3:
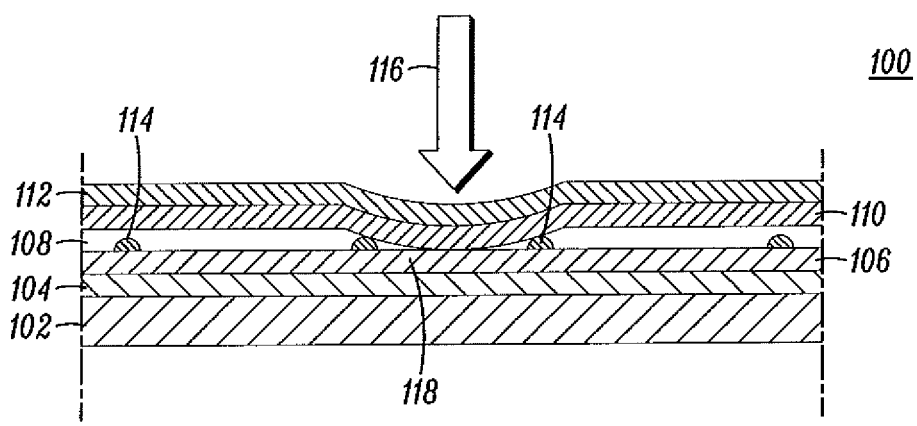
FIG. 3 is a cross sectional view of the TP of FIG. 2 with a force applied to the upper layer in accordance with embodiments of the present system.

The spacer layer 108 may include any suitable layer which may separate the TFS layer 106 from one of the conductive layers 104 and 110. For example, the spacer layer 108 may include, one or more of an insulating spacer portion (e.g., see, 127, FIG. 4) situated along a periphery of the layer and islands 114 (dots, spacers, etc.,) which may separate portions of the TFS layer 106 from the conductive layer 110 including when the conductive layer 110 is displaced by a force as illustrated in FIG. 3. The islands 114 may be dispersed in an interior portion of the TP 100 and may be surrounded by the spacer portion. The islands 114 may each be separated from an adjacent island 114 by a predetermined distance or may be equidistant from adjacent islands 114.

The upper layer 112 may be formed using a suitable polymer which may provide a protective layer, such as may prevent damage to other layers situated under the upper layer 112. Accordingly, the upper layer may include a polyethylene teraphtalate (PET) film which may be deposited upon an adjacent layer such as the conductive layer 110. However, it is also envisioned that other layers may be situated between the conductive layer 110 and the upper layer 112.

FIG. 3 is a cross sectional view of the TP 100 of FIG. 2 with a force applied to the upper layer 112 in accordance with embodiments of the present system. When a force is applied to the TP 100 as illustrated by arrow 116, the upper layer 112 and the conductive layer 110 may deform in response to the force and move towards the TFS layer 106, for example after overcoming any opposing biasing force in the spacer layer 108. In accordance with embodiments of the present system, the conductive layer 110 may contact and/or cause deformation in the TFS layer 106 in accordance with (e.g., depending upon) a magnitude of the force.

Figure 4:
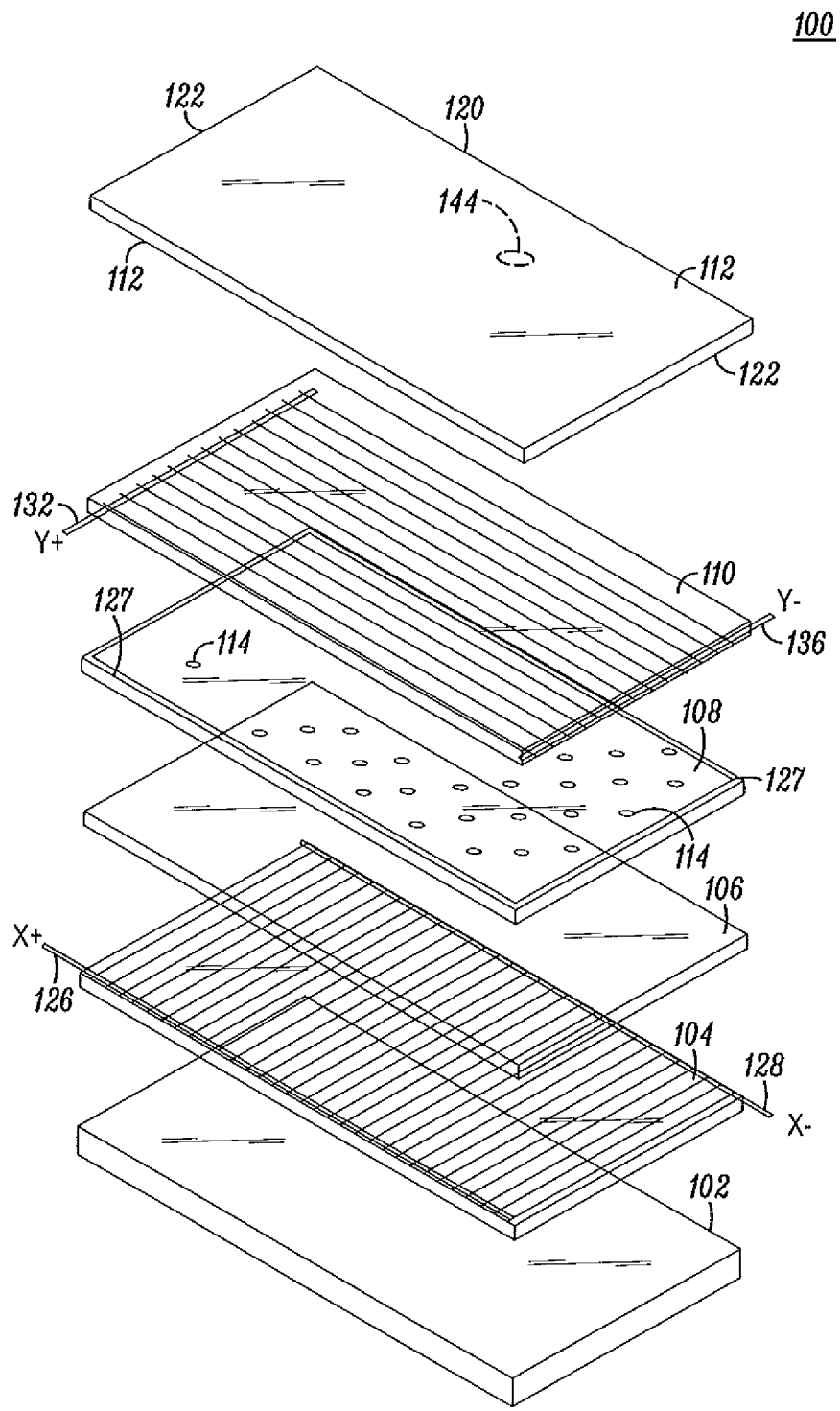
FIG. 4 is an exploded top perspective view of the TP of FIG. 2 in accordance with embodiments of the present system.

FIG. 4 is an exploded top perspective view of the TP 100 of FIG. 2 in accordance with embodiments of the present system. In accordance with embodiments of the present system, the conductive layers 104 and 110 may be blanket layers (e.g., solid conductive layers), such as solid ITO layers. Illustratively, the conductive layers 104 and 110 may be modeled as having conductive traces that extend across a corresponding conductive layer 104 and 110 to provide an equivalent circuit for the conductive layers 104, 110 as described with reference to FIG. 7. The conductive layers 104 and 110 extend electrically between pairs of "busbars" including a positive lead 126 (x+) and a negative lead 128 (x−). In accordance with embodiments of the present system, the conductive layer 110 may extend electrically between pairs of "busbars" including a positive lead 132 (y+) and a negative lead 136 (y−). These "busbar" pairs including leads (e.g., x+, x−, y+, y−) will be discussed in more detail below. For the sake of clarity, the "busbar" pair including the x+ and x− leads will be known as an x-busbar pair and the "busbar" pair including the y+ and y− leads will be known as an y-busbar pair. Each of the x+, x−, y+ and y− leads may have a corresponding coordinate such as left, right, top, bottom, respectively, with reference to the TP 100. One or more of the busbars of the busbar pairs may be patterned to form connection points to a corresponding conductive layers.

The conductive layers 104 and 110 may be situated upon a major surface of a corresponding layer so that the conductive layers are facing the TFS layer 106 or each other. For example, conductive layer 104 may be situated upon an upper major surface and conductive layer 110 may be situated upon a lower major surface. Accordingly, a force applied to the upper layer 112 (e.g., at location or area 144) may cause deformation of the conductive layer 110 and cause the conductive layer 110 to contact the TFS layer 106. The TFS layer 106 may directly contact the conductive layer 104. In accordance with embodiments of the present system, the conductive layers 104, 110 may have a predetermined resistance per unit length in those areas which are electrically located between the x+ and x− leads as well as the y+ and y− leads.

With regard to the spacer layer 108, the islands 114 may be placed in one or more locations in an interior portion of the spacer layer 108 to separate adjacent portions of the conductive layer 110 and the TFS layer 106 from each other. Further, an insulating spacer portion 127 may be situated adjacent a periphery (e.g., an outer periphery) of the spacer layer 108 in a location which is between adjacent surfaces of the conductive layer 110 and the so as to separate one or more portions of the conductive layer 104 and the TFS layer 106 from each other when no external force (e.g., finger, stylus, etc.) is applied.

Figure 5:
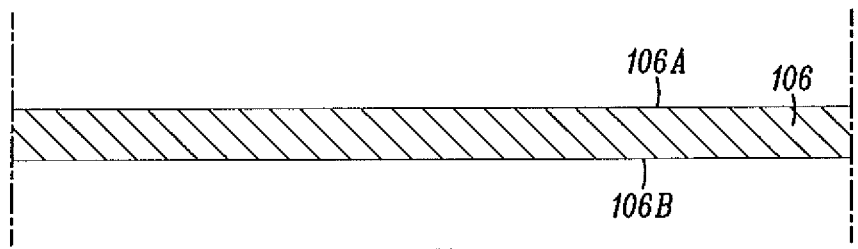
FIG. 5 is a side view of a portion of the TFS layer in accordance with embodiments of the present system.

FIG. 5 is a side view of a portion of the TFS layer 106 in accordance with embodiments of the present system. In FIG. 5, the TFS layer 106 is shown in an uncompressed configuration (e.g., no force is applied to the TFS layer 106) and may include a piezo-resistive material situated in one or more areas of the TP 100. TFS layer 106 may provide information related to a force applied to the TFS layer 106 as resistive information across opposed major surfaces of the TFS layer 106. For example, when the TFS layer 106 is uncompressed (e.g., in a free state) is may have a contact resistance $R_{Touch}$ (e.g., for example illustratively referred to herein as Rt) in a path across opposed major surfaces 106A and 106B of the TFS layer 106. In other words, $R_{Touch}$ may be determined as a resistance across the TFS layer 106 and may be logarithmically proportional to a force applied to TFS layer 106 over a wide range of forces due to force applied to a protective layer of the touch screen by a user. However, $R_{Touch}$ in accordance with embodiments of the present system, may be only linearly proportional to an area (e.g., in mm$^2$) of touch. For example, $R_{Touch}$ may change greatly due to an applied force (e.g., a few decades of resistance) and may only change very little due to area. For example, Rtouch may change from ~1 MOhm at a force of ~5 grams to about 10 kOhm at a force of ~500 grams, for a change of about 100×, however the change of contact area may be only 2× or less. Accordingly, changes of $R_{Touch}$ due to area change may be neglected. The TFS layer 106 may also include one or more electrodes on one or more major surfaced (e.g., each major surface) which may contact adjacent conductive layers.

Figure 6:
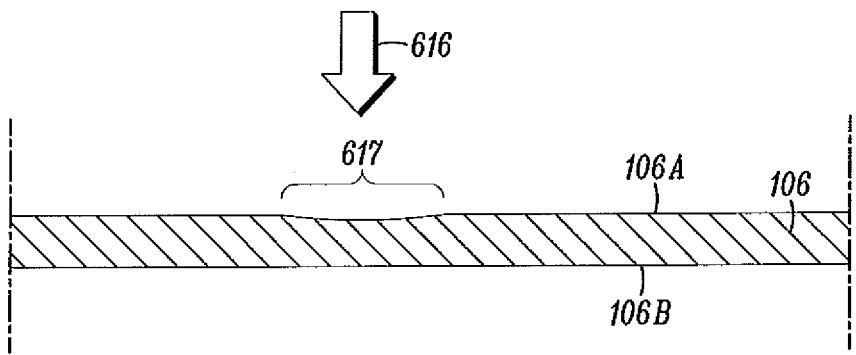
FIG. 6 is a side view of a portion of the TFS layer in accordance with embodiments of the present system.

FIG. 6 is a side view of a portion of the TFS layer 106 in accordance with embodiments of the present system. The TFS layer 106 is illustratively shown in a semi compressed configuration due to force (e.g., force 616) which is applied to a face of the TFS layer 106. The force 616 deforms the TFS layer 106 (e.g., by compressing the TFS layer 106) in an area subject to the force and, thus, in accordance with embodiments of the present system, lowers $R_{Touch}$ in this area (e.g., see, area 617) in which the force is applied. Accordingly, $R_{Touch}$ may be used to determine a magnitude is of a force applied to TFS layer 106 via, for example, a user exerting force (e.g., using a stylus, a finger, etc.) upon the upper layer 112.

Figure 7:
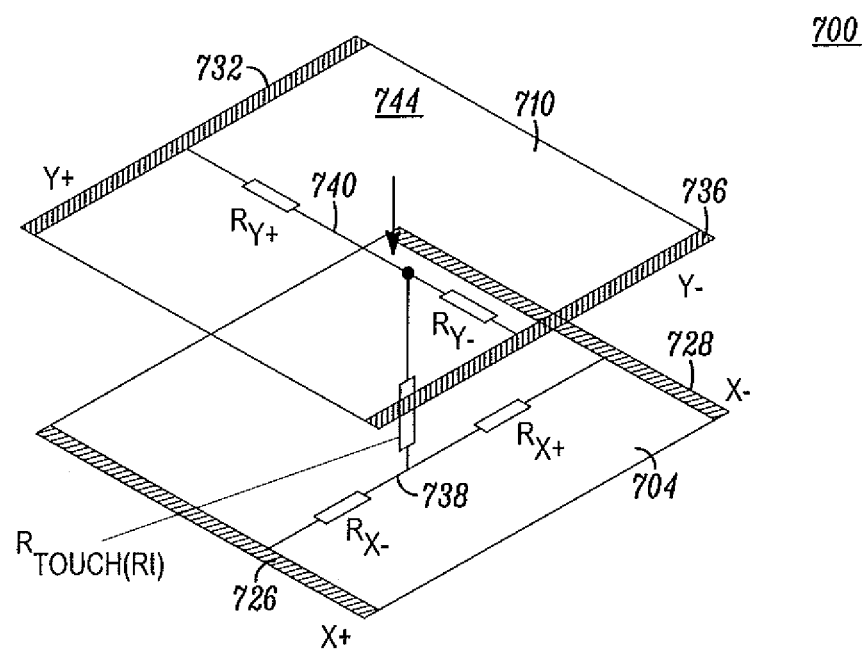
FIG. 7 is an exploded perspective view of an equivalent circuit of a TP similar to the TP of FIG. 4 in accordance with embodiments of the present system.

FIG. 7 is an exploded perspective view of an equivalent circuit of a TP 700 similar as the TP 100 of FIG. 4 in accordance with embodiments of the present system. The TP 700, shown as an analog circuit, may include one or more of first and second conductive layers 704 and 710, respectively, an x busbar pair (across an x plane) including an x+ busbar 726 and an x− busbar 728, a y busbar pair (across a y plane) including a y+ busbar 732 and a y− busbar 736, an x conductive trace 738 extending between the x busbar pair, a y conductive trace 740 extending between the y busbar pair, and a resistive element $R_{Touch}$ situated between the x conductive plane 738 and the y conductive plane 740.

In the present example, it will be assumed that the equivalent circuit represents a circuit corresponding with a TP in which force is being applied at a point or location 744 (hereinafter "the point 744" for the sake of clarity although clearly the force may be exerted over a larger surface area than a simple point as may be readily appreciated by a person of ordinary skill in the art) having given x and y coordinates. In accordance with the illustrative embodiment, the x conductive plane 738 may include equivalent series resistances Rx+ and Rx− on opposite sides of a coordinate of force such as the point 744 along the x-conductive plane 738. In accordance with embodiments of the present system, the x conductive plane 738 may have a known resistance-to-length ratio and a total equivalent resistance of Rx+ plus Rx−, each of which individually and/or collectively may vary in accordance with a location along the x conductive plane 738 where the force is applied. Accordingly, by determining one or more of Rx+ and Rx−, a corresponding location along the x conductive plane 738 where the force is applied may be determined. For example, Rx+ may be 250 ohm and Rx− maybe 100 Ohm, for a total resistance of 350 ohm. As may be readily appreciated, the resistances provided herein are intended for illustrative purposes and other resistances depending on the composition of the conductive layers may be implemented in accordance with embodiments of the present system.

The y conductive plane 740 may include equivalent series resistances Ry+ and Ry− on opposite sides of a point of force such as the point 744 along the y-conductive trace 740. The y conductive plane 740 has a known resistance-to-length ratio and a total equivalent resistance of Ry+ plus Ry− each of which individually and/or collectively may vary in accordance with a location along the y conductive plane 740. Accordingly, by determining one or more of Ry+ and Ry−, a corresponding location along the y conductive plane 740 where the force is applied may be determined. For example, Ry+ maybe 300 ohm and Ry− may be 200 ohm, for a total resistance of 500 ohm.

$R_{Touch}$ may correspond with (e.g., be equivalent to) at least part of a resistance of a path that is between opposed major surfaces 106A and 106B of a TFS layer such as the TFS layer 106 at the point 744 and may be proportional to a force applied at the point 744 against a protective layer of a TP. In accordance with embodiments of the present system, $R_{Touch}$ may be function as a connecting resistor between first and second conductive layers 704 and 710, respectively.

In the present example, a 4-wire (e.g., x- and y-busbar pairs) TSM is illustratively provided which incorporates a single pair of electrodes (e.g., see busbar pairs) on each of the first and second conductive layers, respectively. Each of the busbars may have one or more corresponding leads such as, for example, the x+, x−, y+, and y− leads discussed above. Accordingly, a control system may be connected to the TP using about four leads as opposed to a pair of leads for each parallel conductive trace as some conventional touch screen systems require. Thus, for example, a control system may be electronically coupled to the TP using a four-wire flex cable or four trace flexible printed circuit (FPC), etc. When using a four-wire flex cable or four trace FPC, each of the first, second, third, and fourth wires (or traces) may be electronically coupled to the x+, x−, y+, and y− leads, respectively.

Figure 8:
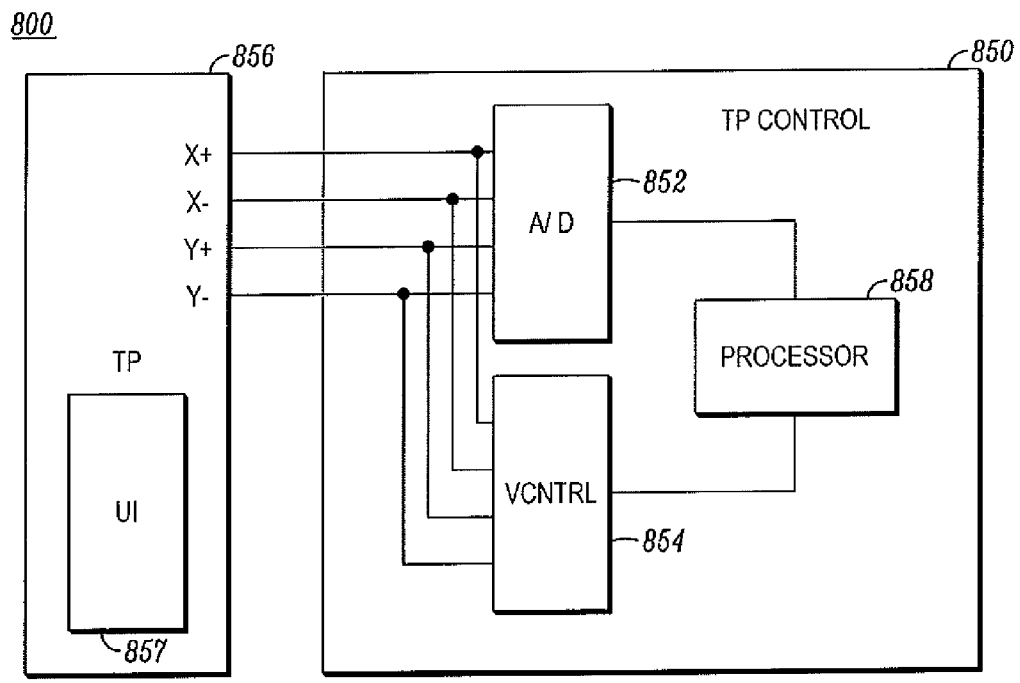
FIG. 8 shows a portion of a TP control system in accordance with embodiments of the present system.

FIG. 8 shows a portion of a TP control system 800 in accordance with embodiments of the present system. The TP control system 800 may include one or more of a TP control portion 850 and a TP 856. The TP 856 may be similar to a TP such as the TP 100 and may include an input/output (IO) interface which may include busbar pairs such as the x+, x−, y+, and y− leads. A user may interface with the TP 856 via the user interface (UI) 857 which may include one or more of a touch screen and a display device for rendering content (e.g., signature content such as "sign here x_____", etc.) for the convenience of a user. The user's inputs (e.g., x, y location and/or contact force (CF)) may be read by the TP control portion 850 and corresponding information may be stored (e.g., signature information) in one or more memories of the TP control system 800. The memories may be local and/or remotely located from each other.

The TP control portion 850 may include one or more of a processor portion 858, a voltage control portion (VCNTRL) 854, and an analog-to-digital (A/D) converter portion 852 (A/D 852). The processor portion 858 may include one or more logic portions such as controllers, processors, application specific integrated circuits (ASICs), etc., which may control the overall operation of the control portion 850. Accordingly, the processor portion 858 may control the VCNTRL 584 and the A/D 852 to perform one or more acts in accordance with embodiments of the present system.

The VCNTRL 854 may be selectively electronically coupled to the x+, x−, y+, and y− leads and may apply one or more voltages to one or more of the x+, x−, y+, and y− leads under the control of the processor portion 858 and/or may float these leads (x+, x−, y+, and y− leads) so that voltages across these leads may be accurately determined by, for example, a voltmeter such as the A/D 852, which may have corresponding inputs electronically coupled to the x+, x−, y+, and y− leads. The VCNTRL 854 may receive voltage and/or lead selection information from the processor portion 858 and may select leads and/or output voltages in accordance with corresponding voltage (e.g., VCC) and/or lead selection (e.g., selectively coupled to the x+ and x− pair) information from the processor portion 858.

The A/D 852 may selectively determine a voltage across one or more of the x+, x−, y+, and y− leads, form corresponding voltage information and forward the voltage information to the processor portion 858 for processing. The A/D 852 may have a desired resolution and may operate under the control of the processor portion 858. Thus, the processor portion 858 may control the A/D 852 to read voltages across one or more the x+, x−, y+, and y− leads, as desired. Referring back to the VCNTRL portion 854, this portion may operate under the control of the processor portion 858 and may apply one or more selected voltages to one or more selected x+, x−, y+, and y− leads, under the control of the processor portion 858. The VCNTRL 854 may include a digital to analog D/A converter which may receive voltage (e.g., VCC) information from the processor portion 858 and may output a corresponding analog voltage to desired leads in accordance with lead selection information and/or address information received from the processor portion 858. The processor portion 858 may transmit lead select information to the VCNTRL 854 and/or the A/D 852 and the VCNTRL 854 and/or the A/D 852 may electronically couple inputs or outputs to one or more of the selected x+, x−, y+, and y− leads in accordance with the lead select information.

The VCNTRL 854 and/or the A/D 852 may have a desired resolution. Leads may be electronically coupled to using any suitable method, such as transistor circuits, relays, a multiplexor (MUX), a demultiplexer (DEMUX), etc., which may selectively electronically couple one or more of the x+, x−, y+, and y− leads to a selected lead of the VCNTRL 854 and/or the A/D 852 or vice versa. The VCNTRL 854 and/or the A/D 852 may include MUXs and/or DEMUXs internally.

However, it is also envisioned that an address matrix under the control of the processor portion 858 may also be used to couple one or more of the x+, x−, y+, and y− leads to a selected lead of the VCNTRL 854 and/or the A/D 852.

Figure 9:
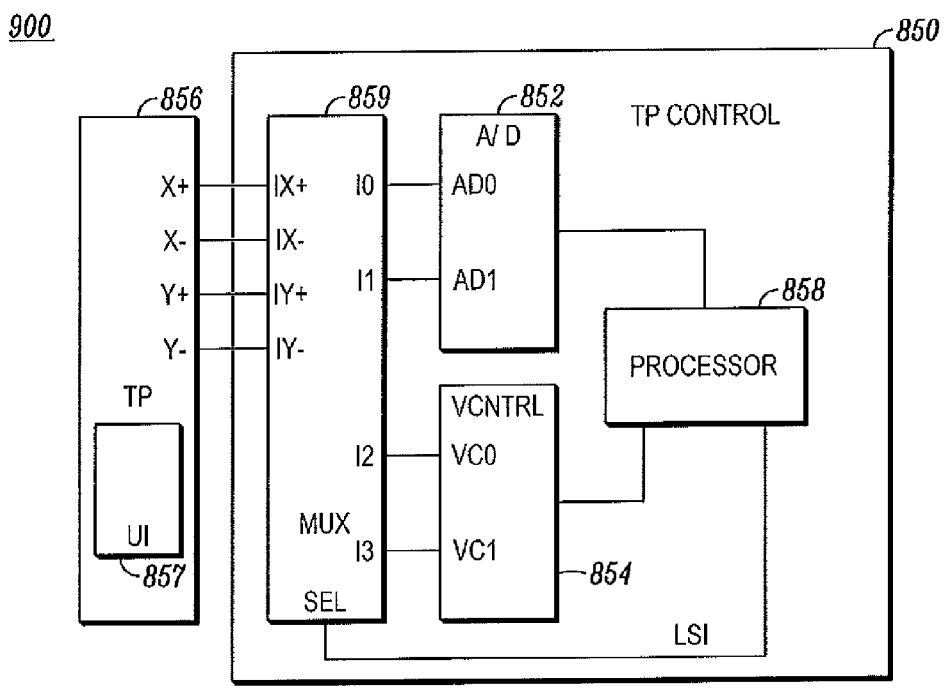
FIG. 9 shows a portion of a TP control system in accordance with embodiments of the present system.

FIG. 9 shows a portion of a TP control system 900 in accordance with embodiments of the present system. The TP control system 900 may be similar to the TP control system 800 and similar numeric designations have been used for the sake of clarity. However, TP control system 900 illustrates a MUX 859 which may include one or more MUXs and/or a DEMUXs and may include input/output I/O leads Ix+, Ix−, Iy+, and Iy− which may be coupled to the x+, x−, y+, and y− leads, respectively, of the TP 856. The MUX 859 may then selectively electronically couple one or more of selected ones of the leads Ix+, Ix−, Iy+, and Iy− to one or more selected leads of the I/O leads I0 through I3 under the control of the processor portion 858. Accordingly, the processor portion 658 may transmit lead select information (LSI) (which may be similar to address selection information) which may include information designating which leads should be electronically coupled to each other. Accordingly, the MUX 859 may include an address selection line (SEL) to receive the LSI from the processor portion 858. The processor portion 858 may also transmit an enable signal to the MUX 859 to enable the MUX. With respect to the A/D 852, AD0 and AD1 may be provided to read a voltage across a circuit. For the sake of clarity, in the present example, it will be assumed that the AD1 will be at a ground potential as is a negative terminal of Vcc (Vcc−).

Figure 10:
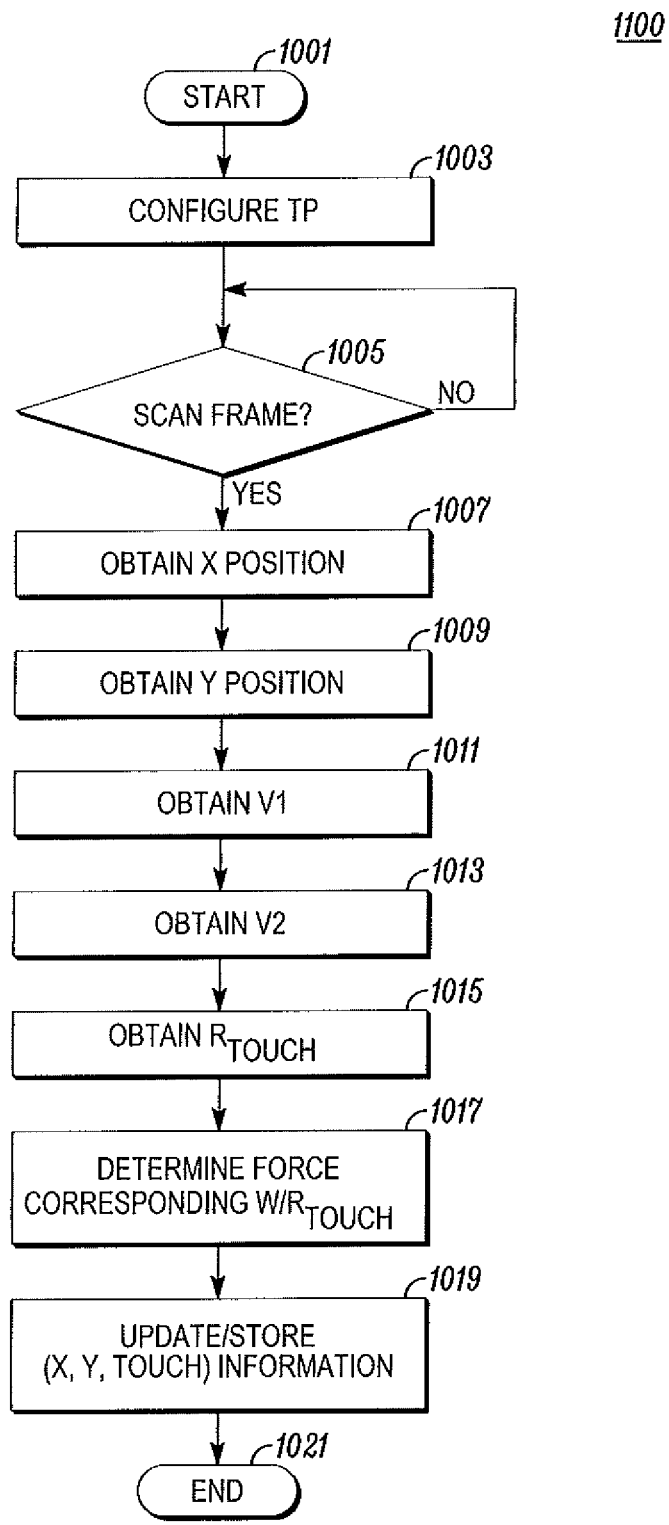
FIG. 10 shows a flow diagram that illustrates a process in accordance with embodiments of the present system.

FIG. 10 shows a flow diagram that illustrates a process 1000 in accordance with embodiments of the present system. The process 1000 may be performed using one or more computers communicating over a network and may obtain information and/or store information using one or more memories which may be local and/or remote from each other. The process 1000 may include one of more of the following acts. Further, one or more of these acts may be combined and/or separated into sub-acts, if desired. In operation, the process may start during act 1001 and then proceed to act 1003.

Circuit analogies of operative acts of the process shown in FIG. 10 are illustrated with reference to FIGS. 11 through 14 as will be described below.

During act 1003, the process may configure to a touch panel (TP). Accordingly, the process may obtain information related to the TP from a memory of the system and/or by calibrating the TP. For example, the process may obtain information related to one or more of size, shape, aspect ratio, resistance, calibration information (e.g., Vx−/Vcc and Vy−/Vcc limits, force/resistance information, Rx, etc.), etc. With respect to Rx, is Rx may correspond with a resistance across the x plane (e.g., across the x bus pair) and may be obtained using any suitable method. For example, Rx may be obtained from a memory of the system or may be measuring during the configuration process using, for example, electrical methods as may be readily appreciated by a person of ordinary skill in the art. For example, the process may pass a known current through the x bus pair and then measure a voltage across the x bus pair (i.e., across x+ and x−). Then, for example knowing that R=V/I (R=resistance, V=voltage, I=current), the process may compute Rx from the known current. After completing act 1003, the process may continue to act 1005.

During act 1005, the process may determine whether to scan a current frame. The process may determine whether to scan a frame by determining whether a controller has requested that a frame be scanned. Further, the process may scan a frame every predetermined time interval (e.g., every 1/60 of a second) or may scan a frame when a change in voltage is sensed across the patterned conductive layers (e.g., the patterned conductive layers 104, 110). In any event, upon determining to scan a frame, the process may continue to act 1007. In the event that the process determines that a frame does not need to be scanned (e.g., no during act 1005), the process may repeat act 1005. As may be readily appreciated, act 1005 may be deleted as the process may simply scan a frame at a time determined by the controller such that an act to determine whether to scan the frame may not be desirable.

During act 1007, the process may determine a coordinate of force (e.g., a coordinate in an x plane due to the user exerting a force on the TP) in a first plane (e.g., an x location in the present example,) by applying a voltage across a busbar pair in the corresponding plane. In the present example, the first plane may correspond with the x plane and an x coordinate of applied force resulting from a touch may be obtained. Thus, the process may configure circuitry of the system such that a known voltage (e.g., Vcc, which may be controlled by the system) may be applied across an x busbar pair (e.g., including x+ and x− busbars) and a corresponding voltage due to Vcc being applied across the x+ and x− busbar pair may be acquired from a y+ busbar.

Figure 11:
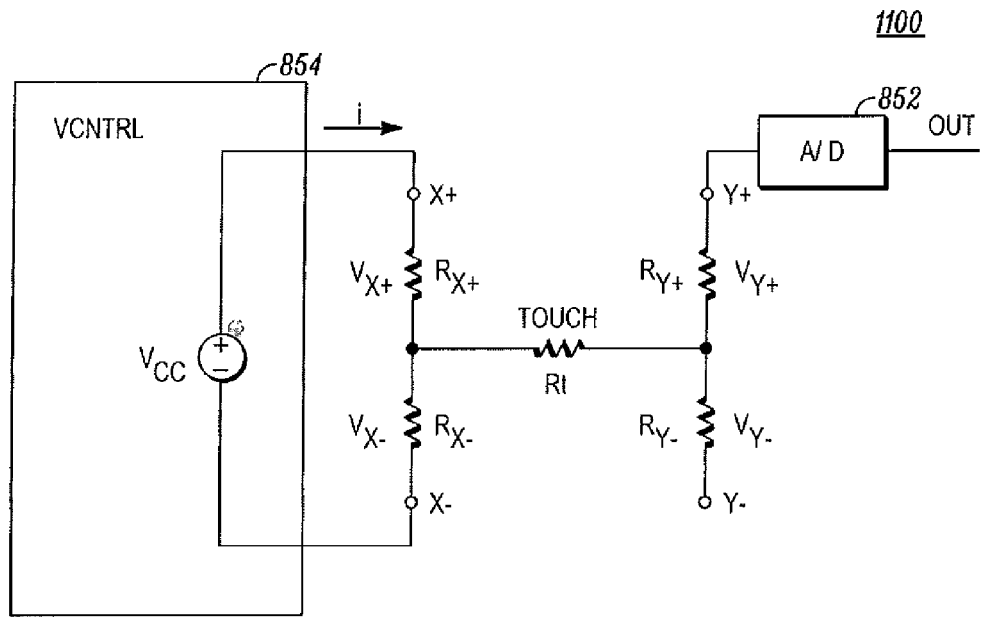
FIG. 11 is a block diagram of an equivalent circuit configuration to obtain an x coordinate of position for the plane in accordance with embodiments of the present system.

A block diagram of an equivalent circuit configuration to obtain an x coordinate of force for the plane in accordance with embodiments of the present system is shown in FIG. 11. As shown, a voltage source (e.g., VCNTRL 854) applies Vcc across the x+ and x− busbar pair while a voltmeter (e.g., A/D 852) measures voltage across the y+ busbar. Then, the voltmeter may output corresponding voltage (e.g., see Vout) information for processing by one or more processors. As the value of resistance Rt (i.e., $R_{Touch}$) is sufficiently high (e.g., due to the lateral resistance of a corresponding TFS layer), most of the current (e.g., see, i) which flows through Rx+ is blocked by Rt and, thus, flows across Rx− as the current passes across the x-plane between the x+ and x− busbars. Thus, the voltage at the y+ busbar is substantially equal to the voltage (i.e., Vx−) across Rx−. Accordingly, Vx− is substantially equal to Vy+ (i.e., a voltage at the Y+ busbar) and may be substituted with a value of Vy+. Then, the process may determine the x location based upon a ratio of Vx−/Vcc. For example, for a 10 bit system, (there are 1024 pixels in each direction within the touch panel,) the X pixel location may be determined by 1024*Vx−/Vcc.

Referring back to Rt, as discussed elsewhere, Rt may be logarithmically proportional to force applied to TFS layer 106 over a wide range of force due to force applied to a protective layer of the touch screen by a user and may be only linearly proportional to an area (e.g., in $mm^2$) of touch. Thus, Rt may change greatly due to force (e.g., a few decades of resistance) and may only change very little due to an area over which the force is applied. For this reason and in accordance with embodiments of the present system, changes of Rt due to the area to which the force is applied may be neglected. After completing act 1007, the process may continue to act 1009.

During act 1009, the process may determine a coordinate of force (e.g., of a stylus or user touching the TP) in a second plane. Accordingly, as the process has determined the coordinate of force in the x plane, it may now similarly determine a y coordinate of force for the y plane (i.e., a y coordinate). This process may be similar to the process described above with respect to act 1007. However, rather than applying a voltage across the x plane, the process now applies a voltage (e.g., Vcc) across the y plane. Accordingly, the process may configure circuitry of the system such that a known voltage (e.g., Vcc in the current example which may be controlled by the system) may be applied across an y busbar pair (e.g., including y+ and y− busbars) and a voltage may be acquired from an x+ busbar.

Figure 12:
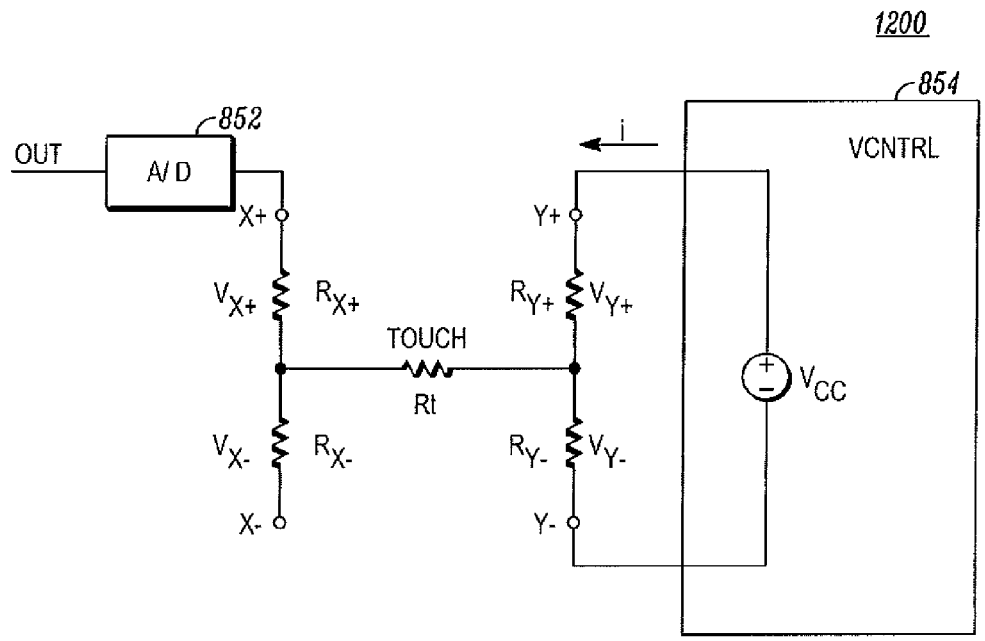
FIG. 12 is a block diagram of an equivalent circuit configuration to obtain a y coordinate of position for the y plane in accordance with embodiments of the present system.

A block diagram of an equivalent circuit configuration to obtain a y coordinate of position for the y plane in accordance with embodiments of the present system is shown in FIG. 12. A voltage source (e.g., VCNTRL 854) applies Vcc across the y+ and y− busbar pair while a voltmeter (e.g., A/D 852) measures voltage across the x+ busbar. Then, the voltmeter may output corresponding voltage (e.g., see Vout) information for processing by one or more processors. As the value of resistance $R_{Touch}$ (i.e., Rt) is sufficiently high (e.g., due to the lateral resistance of a corresponding TFS layer), most of the current (e.g., see, i) which flows through Ry+ is blocked by $R_{Touch}$ and, thus, flows across Ry− as the current passes across the y-plane between the y+ and y− busbars. Thus, the voltage at the x+ busbar is substantially equal to the voltage (i.e., Vy−) across Ry−. Accordingly, Vy− is substantially equal to Vx+ (i.e., a voltage at the x+ busbar) and may be substituted with a value of Vx+. Then, the process may determine the y location based upon a ratio of Vy−/Vcc. For example, for a 10 bit system, (there are 1024 pixels in each direction within the touch panel,) the Y pixel location may be determined by 1024*Vy−/Vcc. As the circuit of FIG. 12 is essentially a mirror image of the circuit of FIG. 11, further description thereof is not provided for the sake of clarity. After completing act 1009, the process may continue to act 1011.

A method of determining $R_{Touch}$ which is a contact resistance of the TFS layer will now be provided with reference to acts 1011 through 1017. To calculate $R_{Touch}$ in accordance with embodiments of the present system, the process may determine V1 and V2 during acts 1011 and 1013, respectively, and then calculate $R_{Touch}$ as will be described below.

Figure 13:
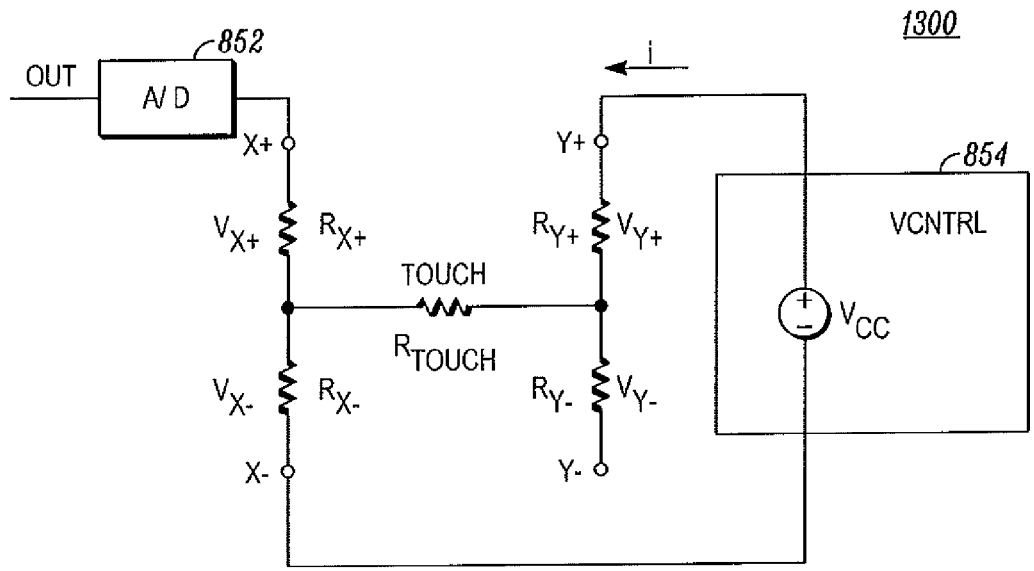
FIG. 13 is a block diagram of an equivalent circuit configuration to obtain V1 in accordance with embodiments of the present system.

During act 1011, the process may determine a voltage V1 at the x+ bus when a voltage Vcc is applied across the y+ bus while the x− bus is grounded as shown by FIG. 13 which is a block diagram of an equivalent circuit configuration to obtain V1 in accordance with embodiments of the present system. Accordingly, the process may configure the VCNTRL 854 so that Vcc is provided across the y+ bus while a ground voltage (e.g., 0 volts) is provided to the x− bus. Further, the process may configure the A/D 852 to acquire voltage information corresponding to V1 at the x+ bus. After acquiring the voltage information related to V1 (e.g., its voltage), the A/D 852 may output a digital representation of V1 to the processor for further processing. After completing act 1011, the process may continue to act 1013.

Figure 14:
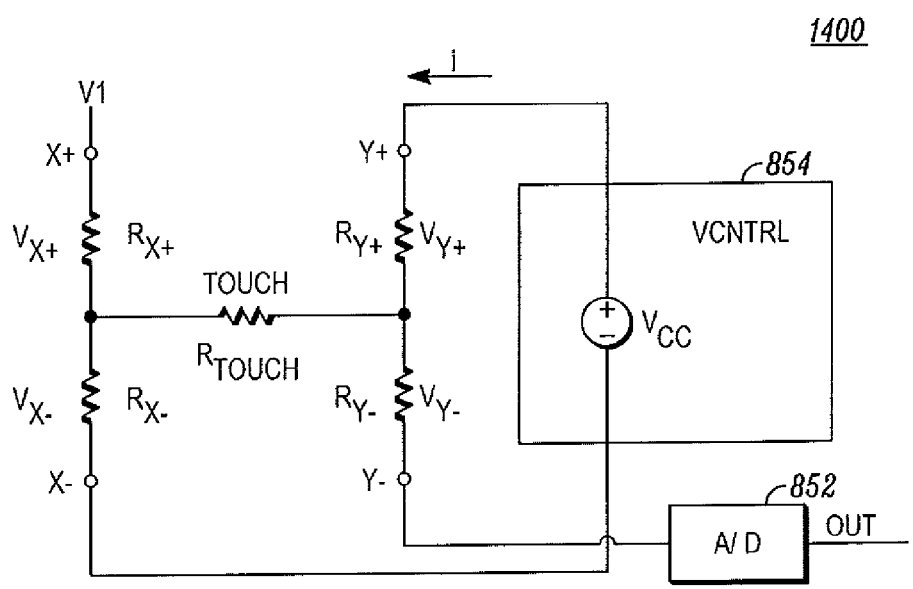
FIG. 14 is a block diagram of an equivalent circuit configuration to obtain V2 in accordance with embodiments of the present system.

During act 1013, the process may determine a voltage V2 at the y− bus when a voltage Vcc is applied across the y+ bus while the x− bus is grounded as shown by FIG. 14 which is a block diagram of an equivalent circuit configuration to obtain V2 in accordance with embodiments of the present system. Accordingly, the process may configure the VCNTRL 854 so that Vcc is provided across the y+ bus and a ground voltage is applied to the x− bus. Further, the process may configure the A/D 852 to acquire voltage information related to V2 at the y− bus. After acquiring the voltage information related to V2 (e.g., its voltage), the A/D 852 may output a digital representation of V2 to the processor for further processing. After completing act 1013, the process may continue to act 1015.

With reference to the circuit of FIG. 13, V1 may be represented as set forth in Equation (1) below.

$$V1 = I*Rx- \qquad \text{Eq. (1)}$$

With reference to I, this is a current flowing through Ry+ as shown.

Similarly, with reference to the circuit of FIG. 14, V2 may be set forth as shown in Equation (2).

$$V2 = I*Rx- + I*R_{Touch} \qquad \text{Eq. (2)}$$

Then, as the current I of the circuits shown in FIGS. 12 and 13 is the same in each of these figures, $R_{Touch}$ (i.e., Rt) can then be obtained by combining Equations 1 and 2 as shown by Equation (3)

$$R_{Touch} = (V2-V1)/I \qquad \text{Eq. (3)}$$

Then as I=V1/Rx−, we may substitute V1/Rx− for I in Equation (3) and obtain Equation (4).

$$R_{Touch} = (V2/V1-1)Rx- \qquad \text{Eq. (4)}$$

Then referring back to the first x position measurement, using Vx=(Vcc/Rx)*Rx−, where Rx is the resistance across the x+ and x− buses of the x plane (or generally resistance across the x plane), we can represent Rx− as shown in equation 5 below.

$$Rx- = (Vx/Vcc)Rx \qquad \text{Eq. (5)}$$

Accordingly, we can replace Rx− in Equation 4 with Equation 5 and obtain Equation 6 below which may be used by the process to easily determine a value of $R_{Touch}$.

$$R_{Touch} = (V2/V1-1)(Vx/Vcc)*Rx \qquad \text{Eq. (6)}$$

Accordingly, during act 1015, the process may calculate a value of $R_{Touch}$ in accordance with Equation (6). After completing act 1015, the process may continue to act 1017.

Figure 10A:
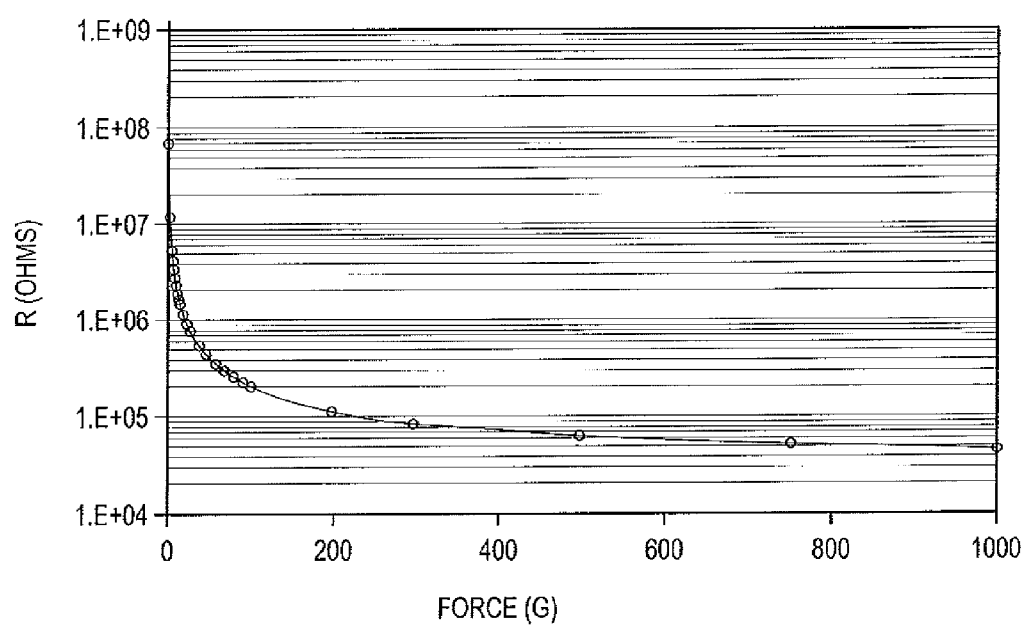
FIG. 10A shows a force-resistance curve in accordance with embodiments of the present system.

During act 1017, the process may use the calculated value of $R_{Touch}$ to determine a magnitude of a corresponding force which is exerted upon a major surface (e.g., the protective layer) of the TP of the present system using any suitable method. For example, the process may compare the calculated value of $R_{Touch}$ to corresponding values in a look-up table including values from a force-resistance curve, such as illustratively shown in FIG. 10A, which values may be stored in a memory of the system. The process may also interpolate values of $R_{Touch}$ to obtain a corresponding force. The process may also calculate the force corresponding with the value of $R_{Touch}$ using, for example, one or more mathematical equations. After completing act 1017, the process may continue to act 1019.

During act 1019, the process may store the determined location (x, y) and corresponding force at the determined location in a memory of the system. Accordingly, the process may update location, force information, may integrate a plurality of locations (x, y) and corresponding forces, (e.g., corresponding with a user entering a signature and/or letters, numerals, etc.) and may store this information, e.g., as touch history information (e.g., including (x, y, touch) information) for later use (e.g., in a signature file, etc.). The information related to location(s) and corresponding force(s) may be referred to as touch history information. The process may also render the touch history information on a display of the system. After completing act 1019, the process may continue to act 1021 where the process may end.

For example, force information may be collected to record and verify a person's signature, such as how hard the person is pressing at each location of his signature.

In traditional resistive touch screens, a contact resistance is related to both the contact force and the area. Accordingly, these two factors are interrelated and difficult to separate. Furthermore, the change of contact resistance over force in prior systems is not stable at low applied forces, yet once the force exceeds a threshold level, the contact resistance looses correlation with the applied force. As a result, the contact resistance does not bear an easily discernable relationship to the applied force. However, according to embodiments of the present system, because of the TFS layer, the contact resistance $R_{Touch}$ may be logarithmically proportional to the force applied to the surface of the touch panel over a wide range of force. Keeping in mind that $R_{Touch}$ in the present embodiments is only linearly proportional to area. Compared to the drastic changes of $R_{Touch}$ of over a few decades of resistance due to force, a much milder change of $R_{Touch}$ with area may be neglected in accordance with embodiments of the present system.

Finally, although embodiments of the present system were illustrated using a single point gesture for the sake of clarity, it is envisioned that the present system may support multi-touch gestures such as pinch and zoom functions using an algorithm based detection system in accordance with embodiments of the present system as opposed to changes in hardware that are required by prior systems.

In summary and as described above in the illustrative embodiments of the present system, a total of only four measurements may be utilized to determine coordinates of a touch position (x, y) and its force Rt for each frame. As this process only requires a few processing acts as opposed to conventional touch screen displays (e.g., matrix multi-touch systems (MMSs)) which separately scans every pixel of each frame, the present system may be an order of magnitude faster than these conventional touch screen displays. Further, location accuracy of the present system may also be improved over conventional touch screen displays. For example, according to embodiments of the present system, a TP may obtain 10 bit resolution in a 4 inch screen. This may translate to ~0.1 mm resolution, as compared to a MAXIMUM resolution (e.g., smallest dimension that may be resolved) of ~1 mm in conventional digital matrix type screens. Accordingly, the present system may provide for different touch panel display processes such as signature capture, etc. Further, due to the inherent simplicity of a TPs according to embodiments of the present system (e.g., no ITO patterning may be needed, driver electronics may be simplified in that much fewer connections and switches/multiplexers are needed, etc.), manufacturing cost may be significantly lower than equivalently sized conventional matrix type touch screen displays (e.g., capacitive or digitally-resistive). In addition, because of the inherent simplicity of the touch screen display of the present system, control systems (e.g., control driver electronics) to drive these displays may also be simpler.

Figure 15:
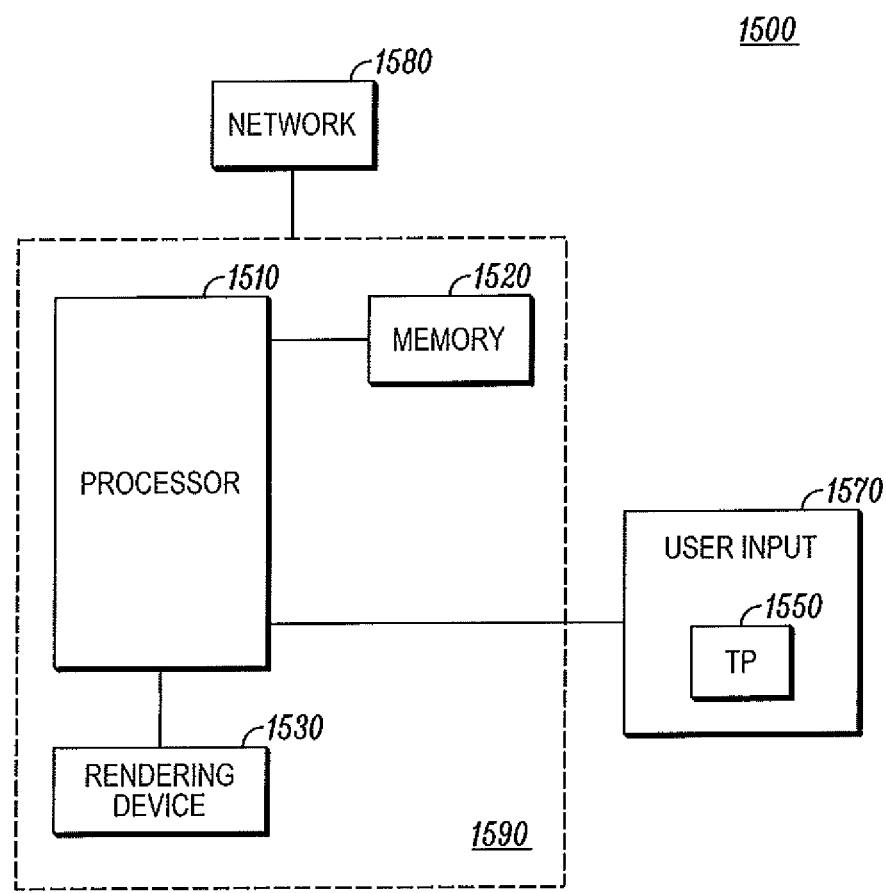
FIG. 15 shows a portion of a system in accordance with embodiments of the present system.

FIG. 15 shows a portion of a system 1500 (e.g., peer, server, user device, etc.) in accordance with embodiments of the present system. For example, a portion of the present system may include a processor 1510 operationally coupled to a memory 1520, a display 1530, a touch panel 1550, and a user input device 1570. The memory 1520 may be any type of device for storing in a non-transitory manner application data as well as other data related to the described operation, such as a look-up table such (e.g., a force-resistance table, etc.). The application data and other data are received by the processor 1510 for configuring (e.g., programming) the processor 1510 to perform operation acts in accordance with the present system. The processor 1510 so configured becomes a special purpose machine particularly suited for performing in accordance with the present system.

The operation acts may include requesting, providing, and/or rendering of content. The user input 1570 may include a keyboard, mouse, trackball or other device, including the TP 1550 (e.g., touch sensitive display, etc.), which may be stand alone or be a part of a system, such as part of a personal computer, personal digital assistant, mobile phone, set top box, television, smartphone or other device (e.g., a user device) for communicating with the processor 1510 via any operable link. The user input device 1570 may be operable for interacting with the processor 1510 including enabling interaction within a UI, such as determining location(s) and applied force(s) as described herein. Clearly the processor 1510, the memory 1520, display 1530 and/or user input device 1570 may all or partly be a portion of a computer system or other device such as a client device, server, user device, etc., as described herein.

The methods of the present system are particularly suited to be carried out by a computer software program, such program containing modules corresponding to one or more of the individual steps or acts described and/or envisioned by the present system. Such program may of course be embodied in a non-transitory computer-readable medium, such as an integrated chip, a peripheral device or memory, such as the memory 1520 or other memory coupled to the processor 1510.

The program and/or program portions contained in the memory 1520 configure the processor 1510 to implement the methods, operational acts, and functions disclosed herein. The memories may be distributed, for example between the clients and/or servers, or local, and the processor 1510, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in an addressable space accessible by the processor 1510. With this definition, information accessible through a network 1580, operationally coupled to the processor 1510 is still within the memory, for instance, because the processor 1510 may retrieve the information from the network 1580 for operation in accordance with the present system.

The processor 1510 is operable for providing control signals and/or performing operations in response to input signals from the user input device 1570 as well as in response to other devices of a network and executing instructions stored in the memory 1520 as well as retrieving information from the memories, such as look-up table information. The processor 1510 may be an application-specific or general-use integrated circuit(s). Further, the processor 1510 may be a dedicated processor for performing in accordance with the present system or may be a general-purpose processor wherein only one of many functions operates for performing in accordance with the present system. The processor 1510 may operate utilizing a program portion, multiple program segments, or may be a hardware device utilizing a dedicated or multi-purpose integrated circuit. Further variations of the present system would readily occur to a person of ordinary skill in the art and are encompassed by the following claims.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method of operating a touch panel (TP) using a controller, the method comprising:

applying a first predetermined voltage (Vcc) across a first end of a first conductive pattern having first and second ends on a first layer and a second end of a second conductive pattern electrically coupled to the first conductive pattern via a resistance (Rt), the second conductive pattern having first and second ends on a second layer;

determining a first voltage (V1) at the second end of the first conductive pattern;

determining a second voltage (V2) at the first end of the second conductive pattern;

applying a second predetermined voltage (Vcc2) across the first and second ends of the first conductive pattern, and measuring a third voltage (V3) at the second end of the second conductive pattern;

determining a value of the resistance (Rt) as a function of the first voltage (V1), the second voltage (V2), the third voltage (V3), and a layer resistance (Rx), wherein the layer resistance (Rx) is the resistance across the first and second ends of the first conductive pattern, said function defined by the equation:

$$Rt=(V2/V1-1)(Vx/Vcc)*Rx;$$

and, producing a control signal based on the determined value of the resistance (Rt).

2. The method of claim 1, further comprising determining a magnitude of a force applied to the first or second layers of the touch panel (TP) based upon a value of the resistance (Rt).

3. The method of claim 1, further comprising determining a coordinate of a force applied to the first or second layers of the touch panel (TP) based upon a ratio of the third voltage (V3) to the second predetermined voltage (Vcc2).

4. The method of claim 1, wherein the resistance (Rt) comprises a variable resistance across a transparent force sensing (TFS) sheet interposed between the first and second layers.

5. A non-transitory computer program stored on a computer readable persistent memory medium, the computer program configured to operate a touch panel (TP) of a user interface (UI), the computer program comprising:
a program portion controlling a processor to:
apply a first predetermined voltage (Vcc) across a first end of a first conductive pattern having first and second ends on a first layer and a second end of a second conductive pattern electrically coupled to the first conductive pattern via a resistance (Rt), the second conductive pattern having first and second ends on a second layer;
determine a first voltage (V1) at the second end of the first conductive pattern;
determine a second voltage (V2) at the first end of the second conductive pattern;
apply a second predetermined voltage (Vcc2) across the first and second ends of the first conductive pattern, and measure a third voltage (V3) at the second end of the second conductive pattern;
determine a value of the resistance (Rt) as a function of the first voltage (V1), the second voltage (V2), the third voltage (V3), and a layer resistance (Rx), wherein the layer resistance (Rx) is the resistance across the first and second ends of the first conductive pattern, said function defined by the equation:

$$Rt=(V2/V1-1)(Vx/Vcc)*Rx;$$

and produce a control signal based on the determined value of the resistance (Rt).

6. The computer program of claim 5, wherein the program portion is configured to:
determine a magnitude of a force applied to the first or second layers of the touch panel (TP) based upon a value of the resistance (Rt); and
determine a coordinate of the force based upon a ratio of the third voltage (V3) to the second predetermined voltage (Vcc2).

7. The method of claim 1, wherein the first predetermined voltage (Vcc) and the second predetermined voltage (Vcc2) are equal.

8. The computer program of claim 5, wherein the first predetermined voltage (Vcc) and the second predetermined voltage (Vcc2) are equal.

* * * * *